(12) United States Patent
Neufeld et al.

(10) Patent No.: US 7,171,410 B1
(45) Date of Patent: Jan. 30, 2007

(54) FAULT TOLERANT NETWORK ELEMENT

(75) Inventors: Gerald Neufeld, Los Altos, CA (US); Jenny Yuan, San Jose, CA (US); Emmanuel Papoutsakis, Vancouver (CA)

(73) Assignee: Redback Networks, Inc., San Jose, CA (US)

( * ) Notice: Subject to any disclaimer, the term of this patent is extended or adjusted under 35 U.S.C. 154(b) by 629 days.

(21) Appl. No.: 09/873,730

(22) Filed: Jun. 2, 2001

(51) Int. Cl.
*G06F 17/30* (2006.01)

(52) U.S. Cl. .............. 707/8; 707/2; 707/10; 707/104.1; 709/220

(58) Field of Classification Search .............. 707/2, 707/8, 10, 104.1, 202, 9; 714/19, 20; 709/220
See application file for complete search history.

(56) References Cited

U.S. PATENT DOCUMENTS

| | | | |
|---|---|---|---|
| 4,847,749 A | 7/1989 | Collins et al. | |
| 5,301,309 A | 4/1994 | Sugano | |
| 5,574,922 A | 11/1996 | James | |
| 5,801,938 A | 9/1998 | Kalantery | |
| 6,115,715 A * | 9/2000 | Traversat et al. | 707/100 |
| 6,119,129 A * | 9/2000 | Traversat et al. | 707/202 |
| 6,526,416 B1 * | 2/2003 | Long | 707/202 |
| 6,665,714 B1 * | 12/2003 | Blumenau et al. | 709/222 |
| 2002/0065795 A1 * | 5/2002 | Asherman | 707/1 |

* cited by examiner

*Primary Examiner*—Tim Vo
*Assistant Examiner*—Hung Pham
(74) *Attorney, Agent, or Firm*—Blakely, Sokoloff, Taylor & Zafman, LLP

(57) ABSTRACT

A method and apparatus for a fault tolerant network element is described. In one embodiment of the invention, a computer implemented method comprises storing an operation and executing the operation idempotently with a network resource process.

28 Claims, 10 Drawing Sheets

FAULT TOLERANT NETWORK ELEMENT

BACKGROUND OF THE INVENTION

1. Field of the Invention

This invention relates to communication networks. More specifically, the present invention relates to the level of fault tolerance of network elements.

2. Description of the Related Art

A variety of reasons exist for a user to configure a network element. For example, a network element is configured at setup, as well as responsive to changes in network policies, account modifications, account deletions, additions, etc. Changes to a network may require new configurations to be entered into the network elements of the network.

To configure a network element, a user logs into the network element and enters the desired configurations one operation at a time. The network element processes each line of configuration entered by the user. If a configuration causes a process in the network element to crash or a process crashes for another reason, then the user must reconfigure the network element at some, possible, unknown point before the crash.

Most network elements have databases to store the configurations entered by the user. In this type of network element, if a process crashes, then the configuration entered by the user is not entirely lost and can be processed from the database once the process restarts. Unfortunately, if the configuration caused the crash, then the process will continue to crash because the configuration is repeatedly processed. Moreover, in such network elements the correct state of the network element is not indicated in the database at the time of the crash and restart. The network element may therefore be in a partially configured state. In addition, one user may enter two configurations to achieve a desired state for the network element, but not achieve it because a second user's configuration (entered concurrently with the first user's configurations) is processed between the first user's two configurations. The second user's configuration may conflict with the first user's configurations. Such line by line processing of configurations can lead to inconsistent states of the network element in a multiple user environment. Moreover, if the process storing the configurations crashes, then the network element must be reconfigured. All of the configurations in the database cannot be processed upon restart of the network element because one user's configurations may conflict with another user's configurations.

Communication networks suffer when a network element is brought down by an errant configuration or some other fault within the network element. The time spent determining the exact state of a crashed network element and then reconfiguring the crashed network element is detrimental to businesses relying on the network and the owner of the network.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known protocols, structures and techniques have not been shown in detail in order not to obscure the invention. In addition, the term process is used herein to describe the invention. The term process is used generically and can encompass the terms task, thread, daemon, etc.

Figure 1:
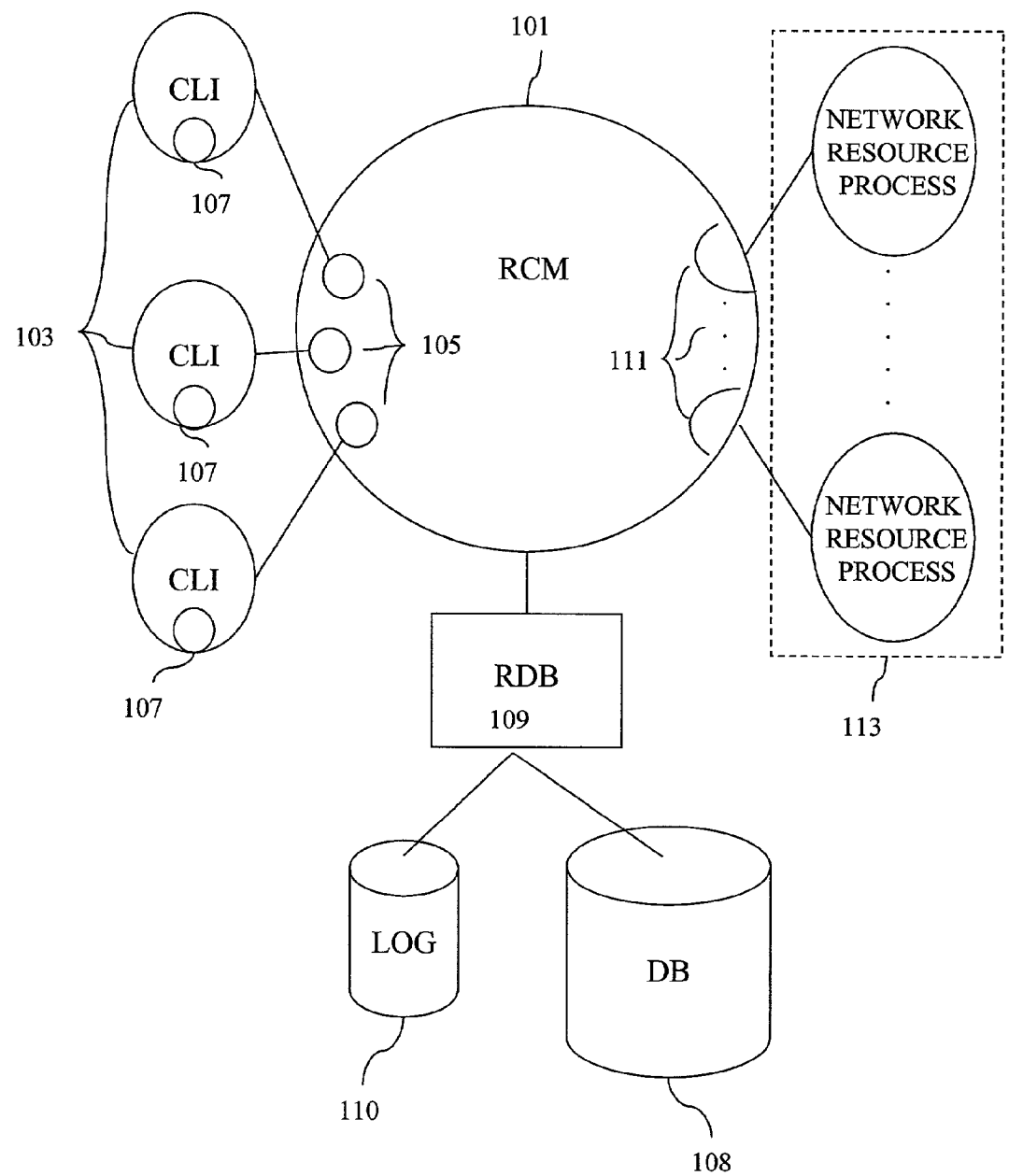
FIG. 1 is a conceptual diagram of a fault tolerant network element according to one embodiment of the invention.

FIG. 1 is a conceptual diagram of a fault tolerant network element according to one embodiment of the invention. In FIG. 1, a reliable configuration manger (RCM) 101 is coupled to a reliable database module (RDB) 109. The RDB 109 is coupled to a stable log memory 110 and a stable RDB memory 108. The memory allocated for the stable log memory 110 and the stable RDB memory 108 is non-volatile memory that lives beyond the memory for the RCM 101 in the case of a failure.

The RCM 101 receives transactions and stores operations from these transactions in the log 110 via the RDB 109. Notwithstanding a failure, operations from a transaction are eventually executed on the stable RDB memory 108 and on the network resource processes 113 (collectively referred to as a backend). The RCM 101 receives transactions from a set of one or more command line interfaces (CLIs) 103. For each CLI 103 that is started, the RCM 101 spawns a session thread represented by circles 105 within RCM 101. Once a CLI 103 has attached to the RCM 101 via its corresponding session thread 105, each CLI 103 begins its own message thread represented by a small circle 107 within each CLI 103. Before a transaction is performed, each unit of the transaction (an operation or command) is processed by a component manager that corresponds to one of the network resource processes of the backend 113. Each unit of the transaction will be referred to as an operation. Operations from a CLI 103 will be referred to as a CLI operation. Component managers are represented by semicircles 111 within the RCM 101. A component manager 111 processes a CLI operation into one or more RDB operations. An RDB operation is either a backend procedure call or a database record request. An example of a CLI operations would be the command "start OSPF" entered by a user at a CLI. The component manager for OSPF would process the CLI operation and create a procedure call to an OSPF process to initialize OSPF. The component manager would also create a database record request to read an OSPF record and a request to update the OSPF record. Each RDB operation is stored within the stable log memory 110 until a commit command for the transaction is received. Once the commit command for the transaction is received, the corresponding RDB operation(s) are performed (the backend procedure call and the database record update request).

Figure 2A:
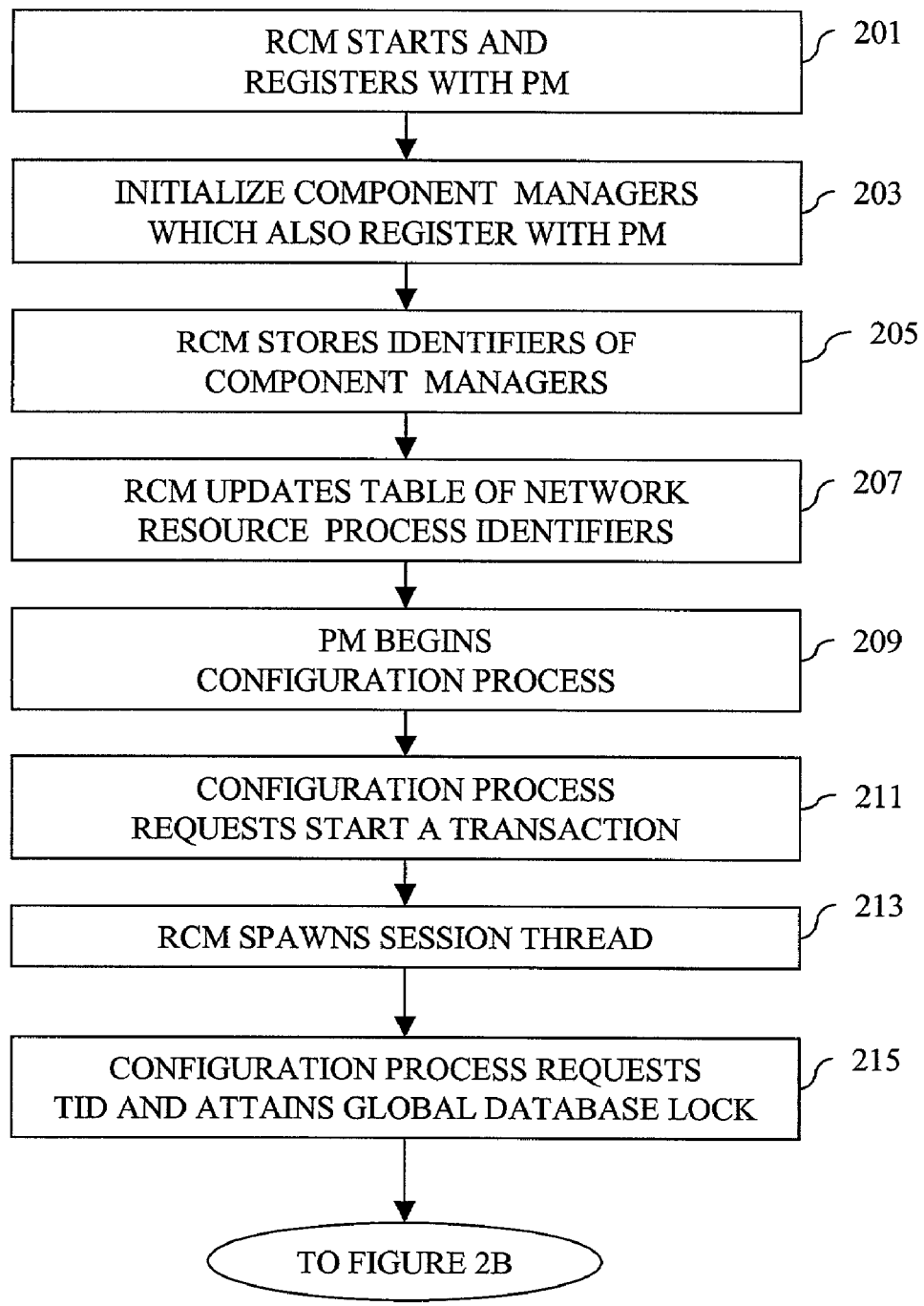
FIG. 2A is a flowchart for the initialization of a reliable configuration manager (RCM) according to one embodiment of the invention.

FIG. 2A is a flowchart for the initialization of the RCM according to one embodiment of the invention. At block 201, the RCM starts and registers with a process manager (PM). At block 203, the RCM initializes its component managers. Each component manager also registers with the PM. At block 205, the RCM stores values that identify its component managers. At block 207, the RCM updates its table of network resource process identifiers. At block 209, the process manager begins a configuration process. The configuration process sends a message to the RCM requesting to start a transaction at block 211. In response to the message, the RCM spawns a new session thread for the configuration process at block 213. At block 215, the configuration process requests a transaction ID and obtains a global lock on the RDB.

Figure 2B:
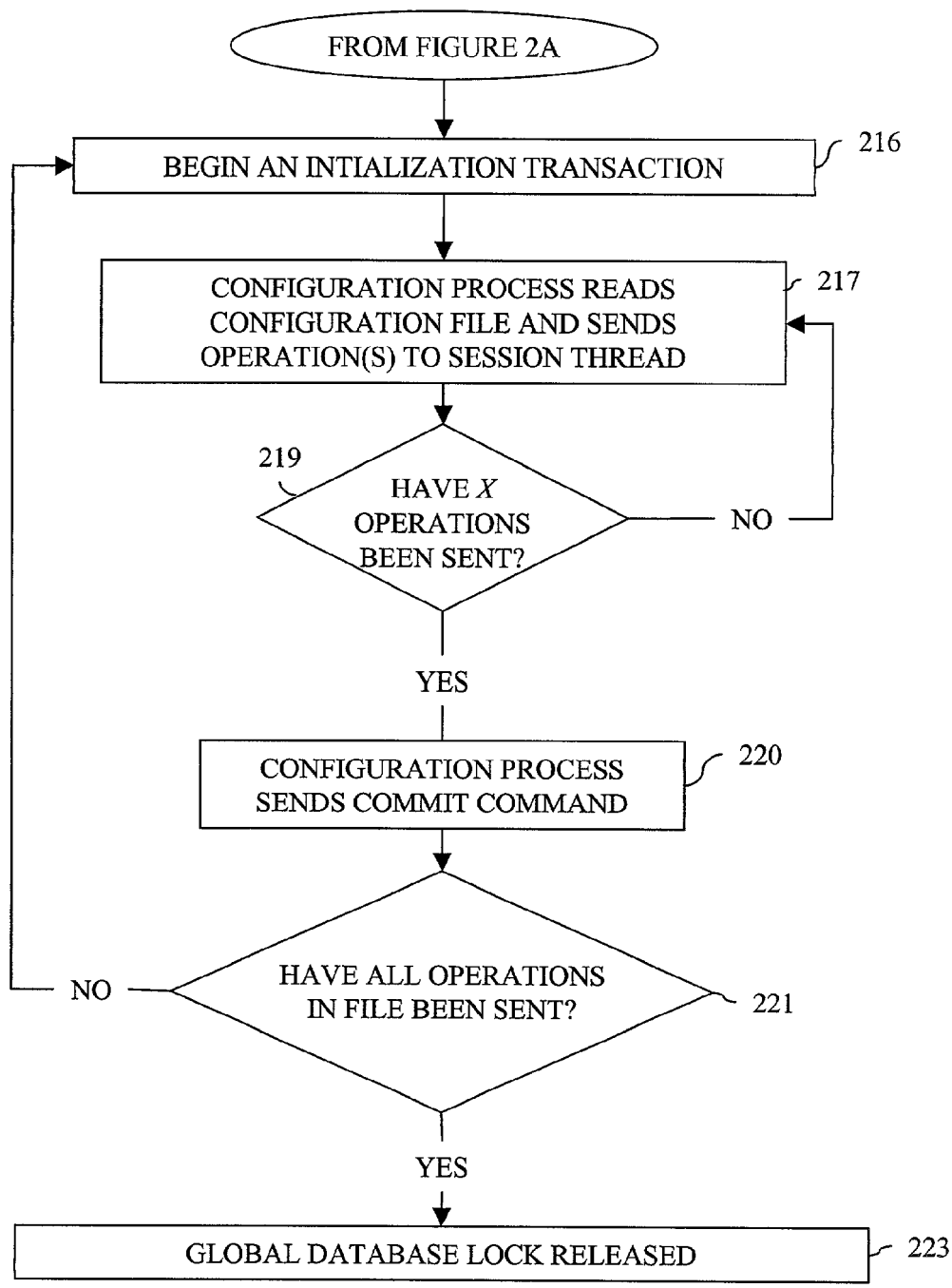
FIG. 2B is a flowchart for the initialization of a reliable configuration manager (RCM) according to one embodiment of the invention.

FIG. 2B is a flowchart for the initialization of the RCM according to one embodiment of the invention. At block 216, an "initialization" transaction is started. At block 217, the configuration process begins to read a configuration file and sending each operation in the configuration file to the session thread. At block 219 it is determined if x operations from the configuration file (x being a predefined number) have been sent to the RCM. If x operations from the configuration file have not been sent, then control flows back to block 217 where the configuration process continues reading and sending operations from the configuration file to its session thread. If x operations from the configuration file have been sent, then at block 220, the configuration process sends a "commit" command to the session thread for the "initialization" transaction. In another embodiment of the invention, the RCM can be set to read the entire configuration file before sending a "commit" command. At block 221, it is determined if there are any further operations in the configuration file to be sent. If there are more operations in the configuration file, then control flows back to block 215, and another "initialization" transaction is started. If there are no more operations within the configuration file, then at block 223 the configuration process releases the global lock on the RDB.

The RDB and log can be implemented in a variety of ways. In one embodiment, each database record is maintained as a record in a linked list. When adding a record to the linked-list, links in the list should be maintained. Two write operations are required to add a node to the list; one to point to the new node, the other to point from the new node to the next node in the list. If these operations are done in an incorrect order and the database process exits after the first operation, then a portion of the linked-list will be lost.

In another embodiment, the log or RDB can be implemented as a hash table of linked lists. Each database record is maintained as a record in a linked list. Each linked list, which represents a transaction, is indexed in the hash table by the transaction ID.

In another embodiment, the RDB is implemented as a binary search tree with rebalancing (an AVL tree), thus reducing access time to a function of log n. Since most of the database records in the database belong to separate and distinct component managers, the records are separated, so that each network resource process has its own binary tree. When a record is accessed, a key is used to determine a network resource process binary tree. The desired record is then retrieved from the network resource process binary tree.

For every request to add or delete a node from the binary tree, all nodes surrounding the object to be changed are replicated. Taking the insert operation as an example, three temporary nodes can be created, one for each node that will surround the newly inserted record. The links within these nodes will be set up correctly so that these three objects plus the new node can be placed in the tree, replacing the three original nodes. This operation can be done atomically. If only binary tree links that point downwards are considered valid upon recovery, then the insert operation can be performed with one write operation by replacing the three nodes with a new section of tree. If the RDB or RCM happens to exit at that point, then all the links that point upward are rebuilt starting from the top of the tree, to ensure recovery to a consistent state. If the RDB or RCM doesn't exit, the up pointers are updated to complete the insert of a node in the tree. The deletion example works much the same except that after a node is deleted, the tree must be rebalanced. This rebalancing would also have to take place every time the tree is initialized.

In another embodiment, the RDB or the log is implemented as an AVL tree with all nodes of the tree linked into a linked-list. Searches may be done using the binary tree search, while an insert or delete could be a linked-list operation followed by a binary tree operation. When the RDB or RCM restarts, it steps through the linked-list, inserting the nodes, one by one into the tree. In yet another embodiment, a flag is used to determine if the binary tree structure is corrupted during the actual binary tree insert or delete operations. A flag is set to indicate a possible tree corruption before an insert or delete operation and the flag is un-set after they are completed. Nodes are re-inserted into the tree only if the flag indicates the tree is potentially corrupted.

Figure 3:
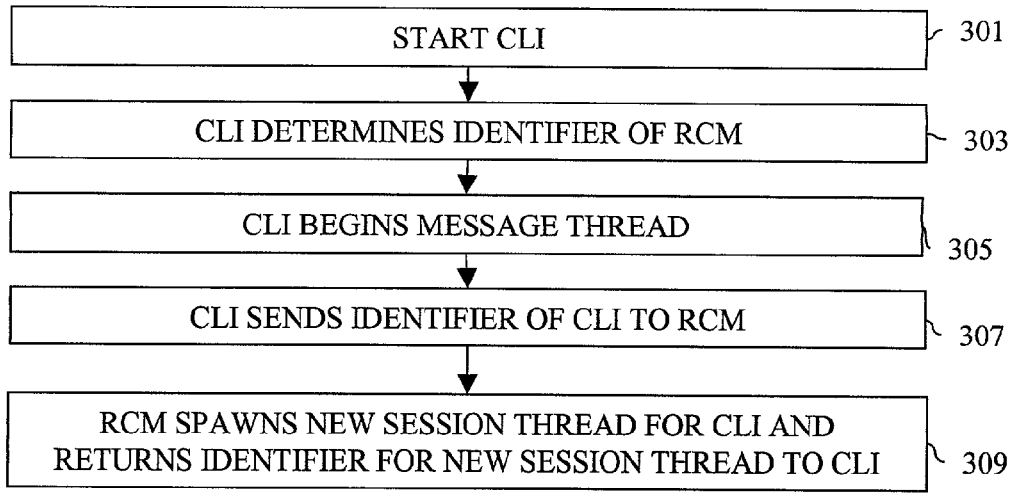
FIG. 3 is a flow chart for attaching a command line interface (CLI) to the reliable configuration manager (RCM) according to one embodiment of the invention.

FIG. 3 is a flow chart for attaching a command line interface (CLI) to the reliable configuration manager (RCM) according to one embodiment of the invention. At block 301, a user initiates a command line interface. At block 303, the CLI determines the identifier of the RCM. At block 305, the CLI begins a message thread. At block 307, the CLI sends its identifier to the RCM. At block 309, the RCM spawns a new session thread for the CLI and returns a value identifying the new session thread to the CLI.

Figure 4A:
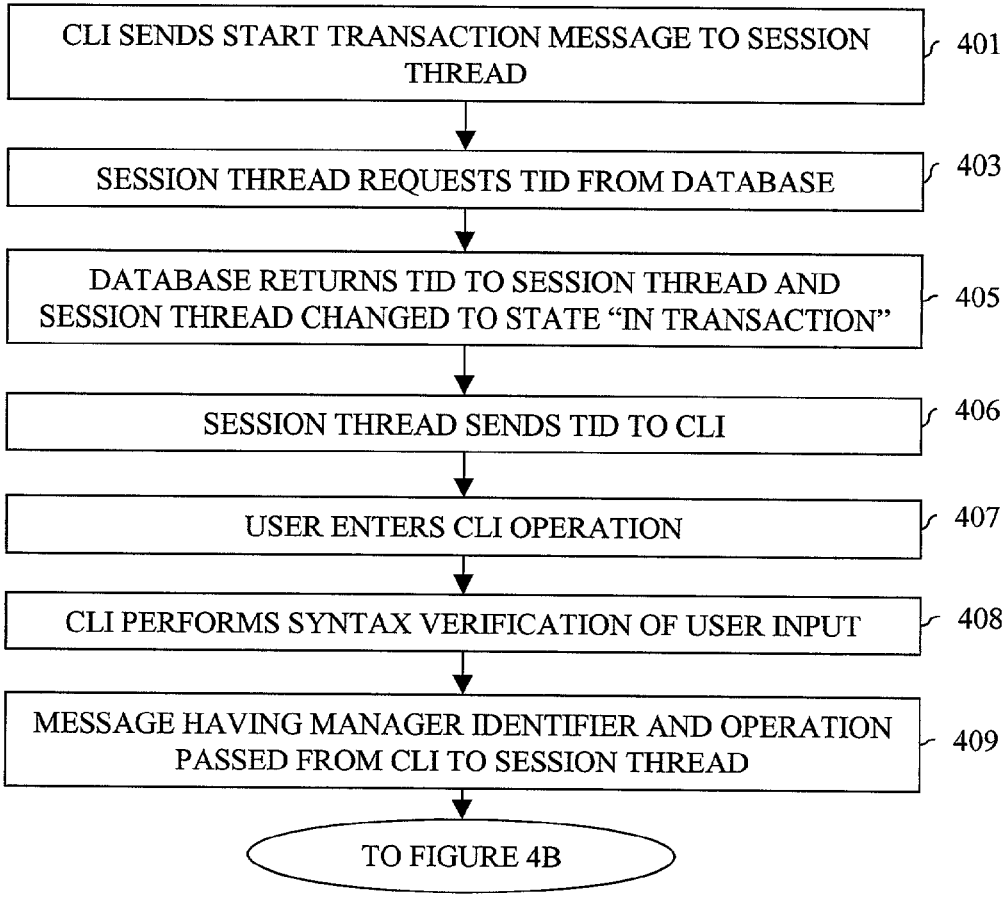
FIG. 4A is a flow chart for beginning a transaction according to one embodiment of the invention.

FIG. 4A is a flow chart for beginning a transaction according to one embodiment of the invention. At block 401, a CLI already attached to the RCM sends a start transaction message to its session thread. At block 403, the session thread requests a transaction ID (TID) from the RDB. At block 405, the RCM returns a TID to the session thread and the state of the session thread is set to "in transaction." At block 406, the session thread sends the TID to the CLI. At block 407, a user at the CLI enters a configuration CLI operation. At block 408, the CLI performs syntax verification of the CLI operation. The CLI then creates a message, which includes a value identifying an appropriate component manager and which includes the CLI operation entered by the user, and passes the message to the session thread at block 409.

Figure 4B:
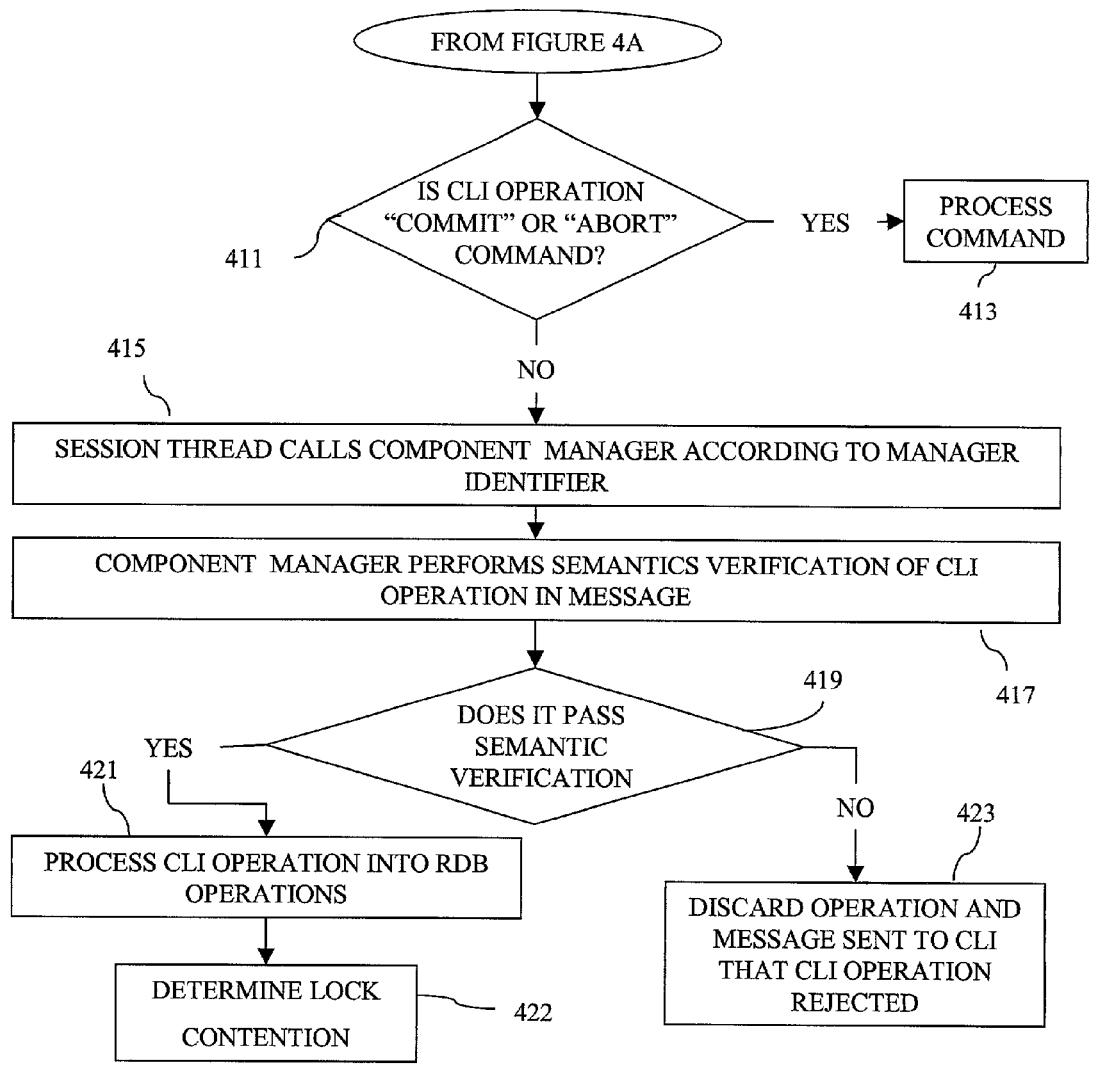
FIG. 4B is a flow chart for processing at least one RDB operation according to one embodiment of the invention.

FIG. 4B is a flow chart for processing at least one RDB operation according to one embodiment of the invention. At block 411, it is determined if the CLI operation in the message is a "commit" or "abort" command. If the CLI operation is a "commit" or "abort" command, then at block 413 the RCM processes the "commit" or "abort" command. If the CLI operation is not a "commit" or "abort" command, then at block 415 the session thread calls a component manager identified by the value in the message and passes the message to the component manager. At block 417, the component manager performs semantic verification of the CLI operation in the message. At block 419, it is determined if the operation passes semantic verification. If the CLI operation does not pass semantic verification, then at block 423 the CLI operation is rejected and a message is sent to the CLI indicating that the CLI operation has been rejected. In one embodiment of the invention, the component manager creates a message indicating the detected semantic error. In another embodiment of the invention, the component manager attempts to correct the error. In another embodiment of the invention, semantic verification is not performed by the component manager. If the operation passes semantic verification at block 419, then at block 421 the component manager processes the CLI operation into one or more RDB operations. An RDB operation can either be a backend procedure call or a database record request. At block 422, lock contention is determined.

Figure 5:
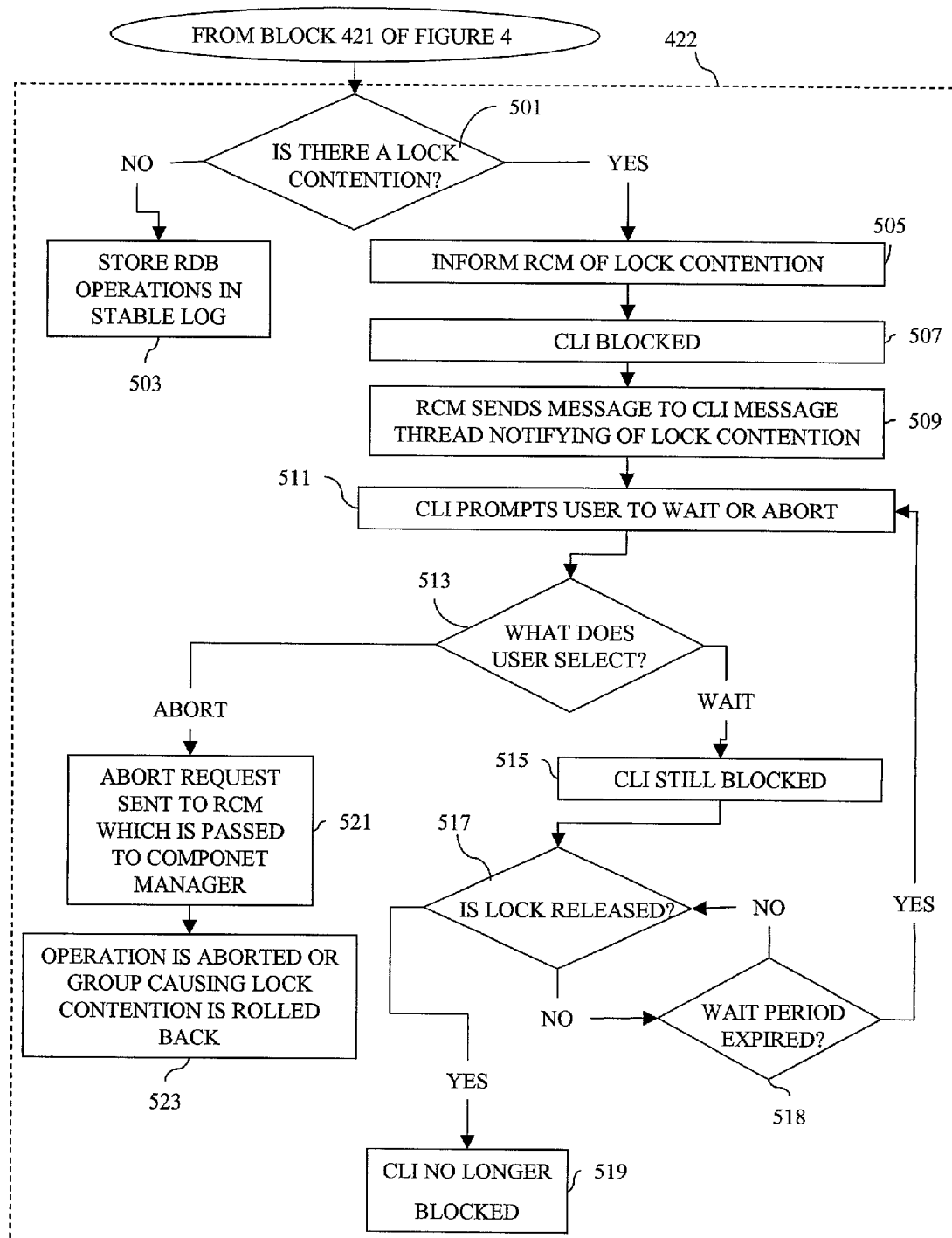
FIG. 5 is a flow chart for determining lock contention according to one embodiment of the invention.

FIG. 5 is a flow chart for determining lock contention according to one embodiment of the invention. At block 501 it is determined if there is a lock contention. If a lock contention is detected at block 501, then at block 505 a message is sent to the RCM informing it of the lock contention. At block 507, the command line interface originating the locking CLI operation is blocked from receiving any further CLI operations because the last CLI operation is not processed. At block 509, the RCM sends a message to the CLI message thread notifying the CLI of the detected lock contention. At block 511, the CLI prompts the user and provides the options of "wait" or "abort." At block 513, it is determined which option the user selects. If the user selects "abort" from block 513, then at block 521 an abort request is sent to the RCM and passed to the corresponding component manager. At block 523, the corresponding component manager aborts the CLI operation. In an alternative embodiment of the invention, groups are implemented and the group causing the lock contention is rolled back at block 523. A group is a set of CLI operations a user has caused to be related by identifying the set of CLI operations as a single logical unit or group. Groups provide one way to maintain consistency. A user can create a group, perform a series of CLI operations to the transaction, and either rollback (discard the CLI operations) or roll forward (accept the CLI operations) the group. With groups a user does not need to abort an entire transaction if it is noticed that the data is inconsistent. By just rolling back the active group, the user can return to a state where the transaction was last valid.

If it is determined that the user selects the option of "wait" at block 513, then at block 515 the CLI continues to be blocked. At block 517, it is determined if the lock has been released. If the lock has not been released, then at block 518 it is determined if the wait period has expired. If the wait period has expired, then control flows to block 511. If the wait period has not expired, then control flows back to decision block 517. If it is determined that the lock has been released at block 517, then at block 519 the CLI is no longer blocked.

If there is no lock contention detected at block 501, then at block 503 the RDB operation(s) are stored in the stable log memory. In one embodiment of the invention, merging is implemented to reduce redundancy in the stable log memory since the number of RDB operations from a transaction can get very large, an attempt should be made to reduce redundancy in the log. Reducing redundancy in the log reduces the time it takes to check if a record exists within it. One such way to reduce redundancy is to merge as many of the log items together as possible. This can be done by looking at all the possible combinations of database record requests ("requests") and determining how to combine them into one request. Merging requests relies on database requests being classified in one of four categories: insert, delete, update, and insert multiple. When a user attempts one of these requests, a series of checks occurs to ensure that the request is allowed. For instance, it would be invalid to insert a record twice or to update a record that has not previously been inserted. To check if a record has previously been inserted, the database must check if the record exists within the stable RDB memory or within the transaction log as an insert or update request.

For example, an insert followed by an update can be replaced by one insert that contains the data from the update. Every two requests to the same record can be merged into one request (or no request—e.g., an insert followed by a delete). The merging though, becomes much more difficult when groups are introduced into the transaction.

In one embodiment implementing groups and merging requests, a history is maintained in order to correctly return the transaction to its state before the group was activated. In order to maintain this history, each request from the transaction will have a state indicating whether it was created inside or outside of a group. If a request exists in the log before a group is active and a modification occurs to this request, then both the old request and the new request will be stored in the transaction log with the old request pointing to the new request. If a rollback occurs, then all the requests that were created when the group was active will be removed. If a roll forward occurs, then a merge will be called between the old and the new requests. In this way, the actual merging of requests is delayed until after the group is complete.

The lock-based system allows a multi-user concurrent environment. Multiple transactions are able to concurrently modify the records in the database, while locks ensure that no two transactions interfere with each other. In one embodiment of the invention, this can be implemented through the use of a two version strict two phase locking protocol. The two-versions of locks are the read and write locks. The two phases are the growth phase and the shrinking phase.

Database record requests in their simplest form can be reduced to either a read or write request. Whenever one of these two requests are issued on a record, a lock of that request type is created if it does not exist, upgraded from a read to a write lock, or unchanged. These locks must be checked before processing an operation of a transaction to ensure that the operation is permitted within that transaction's scope. If two transactions attempt to access the same record, their locks are compared to a conflict table and the operation is either rejected or accepted. A rejected operation results in either the user waiting for the lock to become available, or the transaction that caused the lock contention is aborted.

The two phases of a transaction specify when a transaction can obtain or release locks. The growing phase allows locks to be obtained but not released, while the shrinking phase allows the transaction to release locks, but not obtain any new ones. In one embodiment of the invention, the RDB is implemented with the growing phase as the longer of the two phases and spanning from the start of a transaction to the end of the transaction (commit or abort). Within this time, whenever a record is accessed or modified, a lock will be created on that record. In this implementation, the shrinking phase spans from the commit or abort of the transaction until the transaction complete.

It is possible to get into a deadlock situation where two transactions are each waiting on the other to complete. In one embodiment of the invention, the RDB detects this situation by constructing a wait-for graph for the transactions and ensuring that there are no loops in the graph. To construct a wait for graph, each transaction must have a pointer to the transaction that it is waiting on. If there is a path from one transaction back to itself, then one of the transactions along that path must be aborted to avoid a deadlock situation. Before a transaction is locked, it is added to the wait-for graph. The wait-for graph is then recursively followed starting from the transaction. A loop is detected if the pointers in the wait for graph return to the transaction. Upon detection of a loop, one of the transactions is aborted.

Notification of lock contention allows the users to act more efficiently and understand events of the network element. Without a notification of lock contention, a user would be presented with a locked screen. Without the notification of lock contention the user does not know if the frozen screen is a result of the operation entered, a system error, an error resulting from another user, etc. With a notification of lock contention, the user will be aware of the lock contention and can take a desired course of action.

Figure 6:
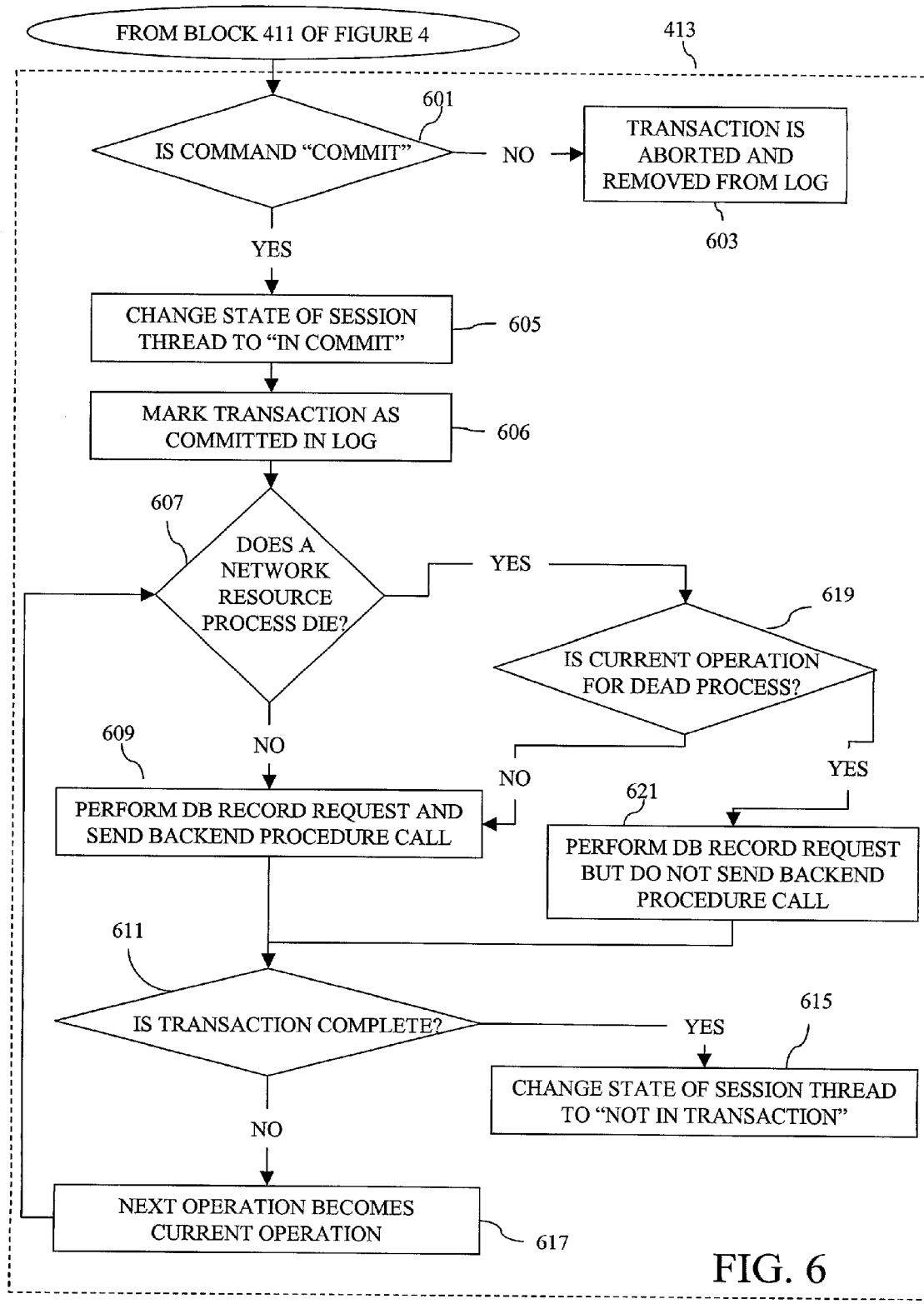
FIG. 6 is a flow chart for processing a commit or abort command indicated in block 413 of FIG. 4 according to one embodiment of the invention.

FIG. 6 is a flow chart for processing a commit or abort command indicated in block 413 of Figure C according to one embodiment of the invention. At block 601 it is determined if the command is a "commit" command. If the command is not a "commit" command, then at block 603 the transaction corresponding to the abort command is aborted and the RDB operations of the transaction are removed from the log. If the command is a "commit" command, then at block 605 the session thread's state is changed from "in transaction" to "in commit." At block 606, the transaction (i.e., the RDB operations corresponding to the transaction) is marked as committed in the log. At block 607, it is determined if a network resource process has died. If a network resource process has not died, then at block 609 the database record request(s) corresponding to the transaction are performed on the stable RDB memory and the backend procedure call(s) corresponding to the transaction are sent to the backend. Each RDB operation of the transaction is executed sequentially. At block 611, it is determined if the transaction is complete. If the transaction is complete, then at block 615 the state of the session thread is changed to "not in transaction." If the transaction is not complete, then at block 617 the next RDB operation in the sequence becomes the current operation. After block 617, control flows back to decision block 607. If at block 607, a network resource process does die, then at block 619 it is determined if the current RDB operation is for the dead network resource process. If the current RDB operation is not for the dead network resource process, then control flows to block 609. If the current operation is for the dead network resource process, then at block 621 the database record request(s) corresponding to the transaction are performed on the stable RDB memory, but the backend procedure call(s) corresponding to the transaction are not sent to the backend. Control flows from block 621 to decision block 611.

Figure 7:
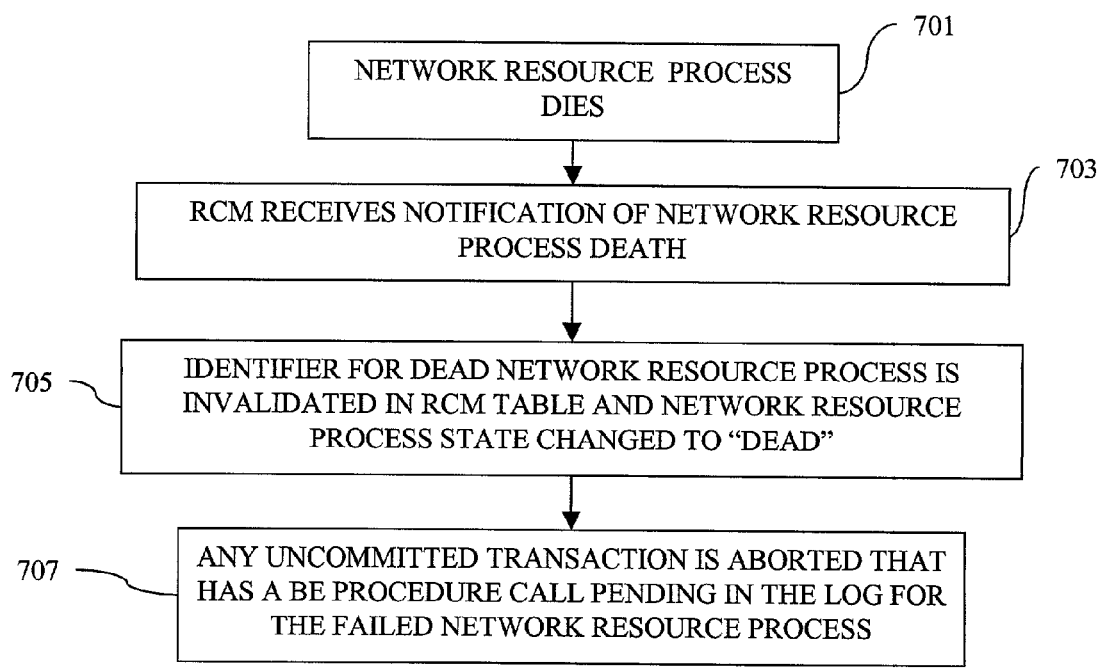
FIG. 7 is a flow chart for resolving death of a network resource process according to one embodiment of the invention.

FIG. 7 is a flow chart for resolving death of a network resource process according to one embodiment of the invention. At block 701, a network resource process dies. At block 703, the RCM receives a death notification for the dead network resource process. At block 705, the RCM invalidates the value identifying the dead network resource process in its table and changes the state of the network resource process to "dead." RDB operations in the log corresponding to the dead network resource process are aborted and messages are sent to the corresponding CLIs at block 707. The messages notify the originating CLIs of abort events. The CLIs can display a message to the user indicating the aborted events. In one embodiment, a CLI displays a message to the user indicating the process that has failed. In another embodiment, the CLI displays a message to the user indicating the CLI operation that has been aborted. In another embodiment, the CLI pauses until the process has been restarted.

Figure 8:
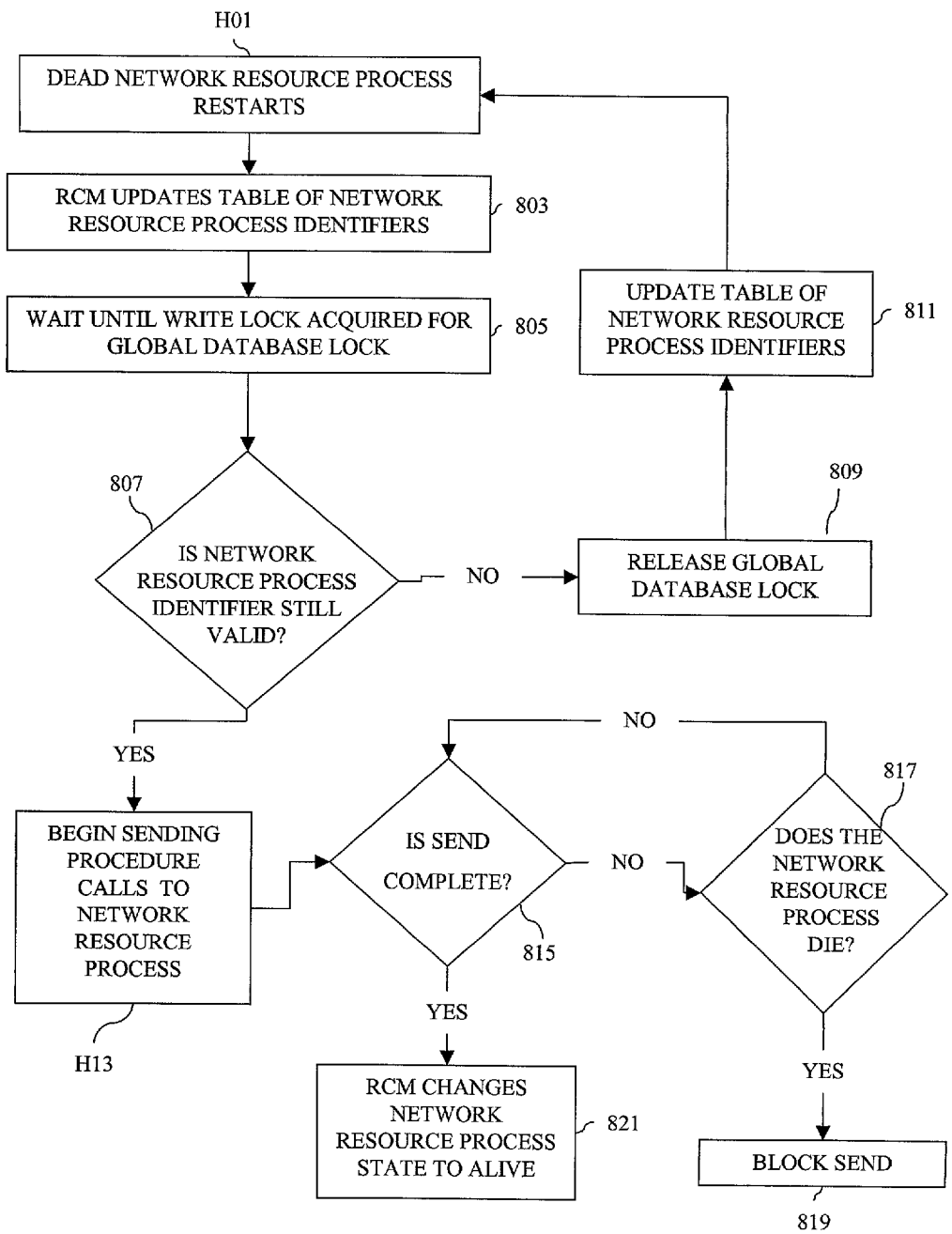
FIG. 8 is a flowchart for the RCM to maintain state consistency when network resource processes restart according to one embodiment of the invention.

FIG. 8 is a flowchart for the RCM to maintain state consistency when network resource processes restart according to one embodiment of the invention. At block 801, a dead network resource process restarts. At block 803, the RCM updates its table of network resource process identifiers with the identifiers for the restarted network resource processes. At block 805, the RCM waits until a global write lock can be acquired for the RDB. At block 807, it is determined if the restarted network resource process identifier is still valid. If the identifier for the restarted network resource process is no longer valid (i.e., the network resource process has died again), then at block 809 the RCM releases the global write lock. At block 811, the RCM removes the value identifying the dead network resource process and control flows back to block 801. If it is determined that the identifier for the restarted network resource process is still valid at block 807, then at block 813 the RCM begins sending backend procedure calls for the restarted processes to the restarted network resource processes. At block 815, it is determined if the RCM has completed sending procedure calls to the restarted network resource processes. If the RCM has not completed sending these operations, then at block 817 it is determined if the restarted network resource process has died again. If the restarted network resource process has not died again, then control flows back to block 815. If the restarted network resource process has died, then at block 819 procedure calls corresponding to the dead network resource process are not sent to the backend. If at block 815 it is determined that RCM has completed sending operations to the restarted network resource processes, then at block 821 the RCM changes the state of the restarted network resource processes to "alive."

Figure 9:
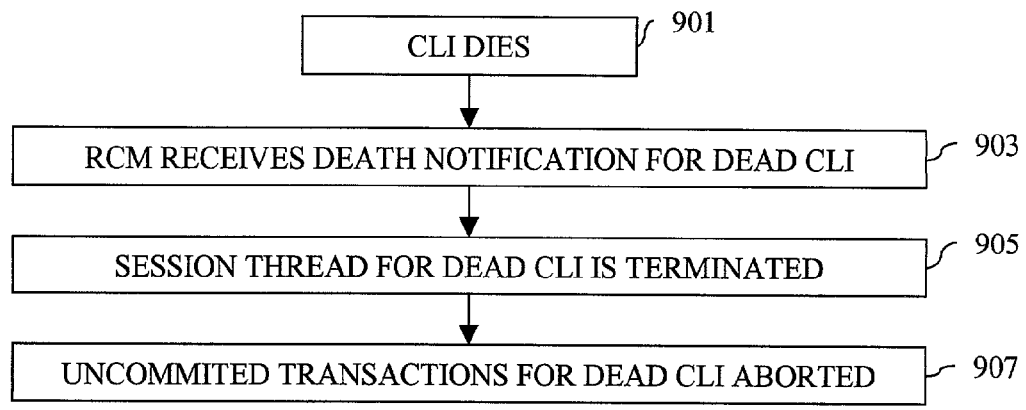
FIG. 9 is a flow chart for the RCM when a CLI dies according to one embodiment of the invention.

FIG. 9 is a flow chart for the RCM when a CLI dies according to one embodiment of the invention. At block 901 a CLI dies. At block 903, the RCM receives notification of the death of the CLI. At block 905, the session thread corresponding to the dead CLI is terminated by the RCM. At block 907, uncommitted transactions that originated from the dead CLI are aborted.

Figure 10:
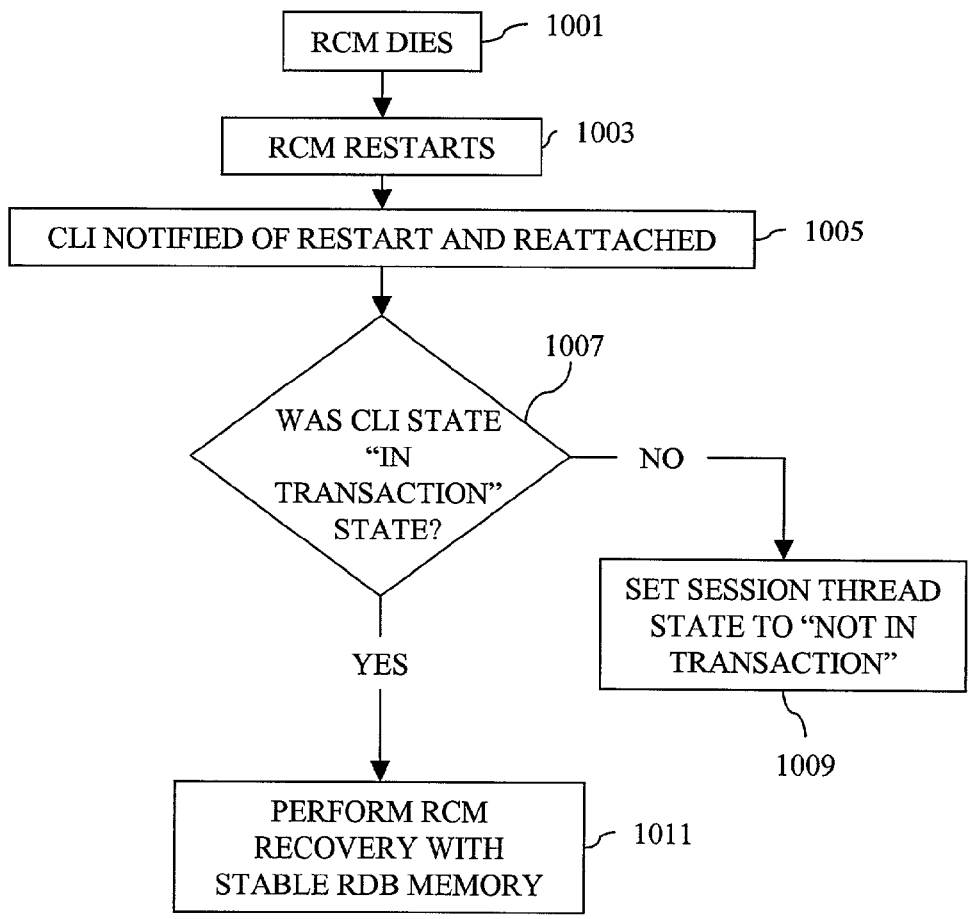
FIG. 10 is a flow chart for restarting the RCM according to one embodiment of the invention.

FIG. 10 is a flow chart for restarting the RCM according to one embodiment of the invention. In Figure J, the RCM dies at block 1001. At block 1003, the RCM is restarted. At block 1005, a CLI is notified of the RCM restarting and the CLI is reattached to the RCM. At block 1007, it is determined if the reattached CLI was in state "in transaction." If the CLI was not in this state, then at block 1009 the state of the session thread corresponding to the CLI is set to "not in transaction." If it is determined at block 1007 that the CLI was in state "in transaction", then at block 1011 the RCM recovers using the stable RCM memory. In one embodiment, RCM recovery includes, the RCM blocking the CLI until the state of the backend is restored to the state indicated by the stable RDB memory. In another embodiment, the RCM attains a write lock on the RDB and then begins to restore the backend to the state indicated by the stable RDB memory.

After a dead network resource process is restarted or the RCM restarts, the same operation will probably be sent to the backend more than once. Having the processes of the backend idempotent allows repeat sending of the same operation without resulting in an inconsistent state. For example, a user may enter a CLI operation to start OSPF with neighboring nodes. The CLI operation would be processed into a procedure call to the OSPF process to begin sending "hello" messages to the neighboring nodes. If the backend in not idempotent, then resending the start OSPF procedure call would restart the transmission of "hello" messages to neighboring nodes resulting in confusion and inefficiency in the neighboring nodes. As long as the backend is idempotent, then the procedure call can be sent multiple times, but the OSPF process will only start the transmission of "hello" messages once.

A fault tolerant network element improves the performance of a network and decreases the downtime of a network. The network providers and entities relying on networks benefit from a network with increased reliability. A fault tolerant network allows a network provided to maximize utilization of the network.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described.

The method and apparatus of the invention can be practiced with modification and alteration within the spirit and scope of the appended claims. The description is thus to be regarded as illustrative instead of limiting on the invention.

We claim:

1. A computer implemented method performed by a network element, the method comprising:

receiving at a configuration manager of the network element a request from a user via a command line interface (CLI) of the network element for accessing one or more records of a database that is used to configure operations of the network element, wherein the CLI is one of a plurality of CLI interfaces provided by the network element to substantially concurrently access the database, wherein in response to the request, the configuration manager spawns a session thread to associate the CLI with the configuration manager, wherein the session thread is used by the CLI to communicate messages with the configuration manager;

the CLI sends a message to the spawned session thread indicating starting of a transaction;

the spawned session thread requests a transaction ID;

the configuration manager returns the requested transaction ID to the spawned session thread and sets the spawned session thread to an in-transaction state;

receiving from the CLI a configuration CLI operation;

performing a syntax verification of the received configuration CLI operation;

sending a message includes a value identifying a component manager to the spawned session thread;

for the received configuration CLI operation, the configuration manager:

invoking the identified component manager, the invoked component manager is associated with the received configuration CLI operation to process the received configuration CLI operation into one or more database operations;

recording the one or more database operations in a transaction log separated from the database without accessing the database until a commit command is received from the user via the CLI of the network element; and in response to the commit command from the CLI indicating that the user has committed to the one or more database operations, transmitting the recorded one or more database operations from the transaction log to the database;

performing the recorded one or more operations within the database in response to receiving the recorded database operations from the transaction log, wherein the recorded one or more operations comprising read or write operations.

2. The method of claim 1, wherein content of the transaction log is maintained in a persistent memory after the network element is powered down or rebooted.

3. The method of claim 1, further comprising prior to recording the one or more database operations in the transaction log, acquiring a lock for locking the one or more records of the database associated with the request to prevent other users from accessing the one or more records of the database.

4. The method of claim 3, further comprising:

receiving further modification of configuration from the user prior to the commit command; and storing the modification in the transaction log without accessing the database until the commit command is received from the user upon which the modification of the configuration is committed from the transaction log to the locked one or more records of the database.

5. The method of claim 4, further comprising:

receiving an abort command from the user via the CLI prior to receiving the commit command; and in response to the abort command, removing the one or more database operations from the transaction log and releasing the acquired lock without accessing the database.

6. The method of claim 5, wherein after performing the removing and releasing in response to the abort command, the one or more records of the database remains substantially identical with respect to the one or more records prior to receiving the request.

7. The method of claim 3, further comprising:

indicating the spawned session thread is in a committing state while committing the one or more database operations.

8. The method of claim 1 further comprising:
the configuration manager initially configuring the network element during an initialization period of the network element by initiating an initialization transaction, including:
a process manager starting a configuration process by sending a message to the configuration manager requesting the initialization transaction;
obtaining a lock on the one or more records of the database, the configuration process reading configuration operations from a configuration file and sending each of the configuration operations to the spawned session thread using the transaction ID while the database is locked.

9. The method of claim 1, further comprising:
determining whether the received configuration CLI operation is one of a commit command and an abort command;
if the received configuration CLI operation is not one of the commit and abort commands, the invoked component manager performing semantic verification of the received configuration CLI operation and rejecting the received configuration CLI operation if the received configuration CLI operation does not pass the semantic verification,
if the received configuration CLI operation passes the semantic verification, the component manager processing the received configuration CLI operation into one or more database operations to be performed within the database.

10. The method of claim 9, further comprising:
the invoked component manager determining whether a lock contention exists;
if the lock contention exists, the invoked component manager notifying the configuration manager to block further CLI operations from the CLI;
in response to the notification, the invoked configuration manager notifying the CLI regarding the lock contention;
the CLI prompting the user to either to wait or abort the received configuration CLI operation;
in response to an abort command received from the user, the component manager aborts the received configuration CLI operation.

11. The method of claim 10, further comprising:
in response to a wait command received from the user, the invoked component manager continuing blocking the received configuration CLI operation;
the invoked component manager periodically checking whether the lock contention has been released;
if the lock contention has not been released, the invoked component manager determining whether a period of time associated with the wait command has expired;
if the wait command has expired, prompting the user for further instructions including whether the user wants to wait or abort.

12. The method of claim 11, further comprising:
if the received configuration CLI operation includes an abort command, the transaction corresponding to the abort command is aborted and the one or more database operations are removed from the transaction log;
if the received configuration CLI operation includes a commit command, the spawned session thread transitioning from the in-transaction state to an in-commit state;
marking the one or more database operations in the transaction log as committed;

determining whether a network resource process for processing the received configuration CLI operation has died;
if the network resource process has not died, committing the one or more database operations to the database via a backend procedure call;
changing the spawned session thread from the in-commit state to a not-in-state when the performing the recorded one or more operations is completed.

13. The method of claim 12, further comprising:
if the network resource process has died, determining whether a current database operation is associated with the network resource process;
if the current database operation is not associated with the network resource process, performing database record request and invoking a backend procedure call;
if the current database operation is not associated with the network resource process, performing database record request without invoking a backend procedure call.

14. The method of claim 3, further comprising:
determining whether the lock being acquired is unavailable;
notifying the user via the CLI that the lock is unavailable; and
prompting the user whether the user desires to wait or cancel the request.

15. A computer storage medium having executable code to perform a method of a network element, the method comprising:
receiving at a configuration manager of the network element a request from a user via a command line interface (CLI) of the network element for accessing one or more records of a database that is used to configure operations of the network element, wherein the CLI is one of a plurality of CLI interfaces provided by the network element to substantially concurrently access the database,
wherein in response to the request,
the configuration manager spawns a session thread to associate the CLI with the configuration manager, wherein the session thread is used by the CLI to communicate messages with the configuration manager;
the CLI sends a message to the spawned session thread indicating starting of a transaction;
the spawned session thread requests a transaction ID;
the configuration manager returns the requested transaction ID to the spawned session thread and sets the spawned session thread to an in-transaction state;
receiving from the CLI a configuration CLI operation;
performing a syntax verification of the received configuration CLI operation;
sending a message includes a value identifying a component manager to the spawned session thread;
for the received configuration CLI operation, the configuration manager:
invoking the identified component manager, the invoked component manager is associated with the received configuration CLI operation to process the received configuration CLI operation into one or more database operations;
recording the one or more database operations in a transaction log separated from the database without accessing the database until a commit command is received from the user via the CLI of the network element; and in response to the commit command from the CLI indicating that the user has committed to the one or more database operations, transmitting the recorded one or more database operations from the transaction log to the database;

performing the recorded one or more operations within the database in response to receiving the recorded database operations from the transaction log, wherein the recorded one or more operations comprising read or write operations.

16. The computer storage medium of claim 15, wherein content of the transaction log is maintained in a persistent memory after the network element is powered down or rebooted.

17. The computer storage medium of claim 15, wherein the method further comprising prior to recording the one or more database operations in the transaction log, acquiring a lock for locking the one or more records of the database associated with the request to prevent other users from accessing the one or more records of the database.

18. The computer storage medium of claim 17, wherein the method further comprising:

receiving further modification of configuration from the user prior to the commit command; and storing the modification in the transaction log without accessing the database until the commit command is received from the user upon which the modification of the configuration is committed from the transaction log to the locked one or more records of the database.

19. The computer storage medium of claim 18, wherein the method further comprising:

receiving an abort command from the user via the CLI prior to receiving the commit command; and in response to the abort command, removing the one or more database operations from the transaction log and releasing the acquired lock without accessing the database.

20. The computer storage medium of claim 19, wherein after performing the removing and releasing in response to the abort command, the one or more records of the database remains substantially identical with respect to the one or more records prior to receiving the request.

21. The computer storage medium of claim 17, wherein the method further comprising:

indicating the spawned session thread is in a committing state while committing the one or more database operations.

22. The computer storage medium of claim 15, wherein the method further comprising:

the configuration manager initially configuring the network element during an initialization period of the network element by initiating an initialization transaction, including:

a process manager starting a configuration process by sending a message to the configuration manager requesting the initialization transaction;

obtaining a lock on the one or more records of the database, the configuration process reading configuration operations from a configuration file and sending each of the configuration operations to the spawned session thread using the transaction ID while the database is locked.

23. The computer storage medium of claim 15, wherein the method further comprising:

determining whether the received configuration CLI operation is one of a commit command and an abort command;

if the received configuration CLI operation is not one of the commit and abort commands, the invoked component manager performing semantic verification of the received configuration CLI operation and rejecting the received configuration CLI operation if the received configuration CLI operation does not pass the semantic verification, if the received configuration CLI operation passes the semantic verification, the component manager processing the received configuration CLI operation into one or more database operations to be performed within the database.

24. The computer storage medium of claim 23, wherein the method further comprising:

the invoked component manager determining whether a lock contention exists;

if the lock contention exists, the invoked component manager notifying the configuration manager to block further CLI operations from the CLI;

in response to the notification, the invoked configuration manager notifying the CLI regarding the lock contention;

the CLI prompting the user to either to wait or abort the received configuration CLI operation;

in response to an abort command received from the user, the component manager aborts the received configuration CLI operation.

25. The computer storage medium of claim 24, wherein the method further comprising:

in response to a wait command received from the user, the invoked component manager continuing blocking the received configuration CLI operation;

the invoked component manager periodically checking whether the lock contention has been released;

if the lock contention has not been released, the invoked component manager determining whether a period of time associated with the wait command has expired;

if the wait command has expired, prompting the user for further instructions including whether the user wants to wait or abort.

26. The computer storage medium of claim 25, wherein the method further comprising:

if the received configuration CLI operation includes an abort command, the transaction corresponding to the abort command is aborted and the one or more database operations are removed from the transaction log;

if the received configuration CLI operation includes a commit command, the spawned session thread transitioning from the in-transaction state to an in-commit state;

marking the one or more database operations in the transaction log as committed;

determining whether a network resource process for processing the received configuration CLI operation has died;

if the network resource process has not died, committing the one or more database operations to the database via a backend procedure call;

changing the spawned session thread from the in-commit state to a not-in-state when the performing the recorded one or more operations is completed.

27. The computer storage medium of claim 26, wherein the method further comprising:
- if the network resource process has died, determining whether a current database operation is associated with the network resource process;
  - if the current database operation is not associated with the network resource process, performing database record request and invoking a backend procedure call;
- if the current database operation is not associated with the network resource process, performing database record request without invoking a backend procedure call.

28. The computer storage medium of claim 25, wherein the method further comprising:
- determining whether the lock being acquired is unavailable;
- notifying the user via the CLI that the lock is unavailable; and
- prompting the user whether the user desires to wait or cancel the request.

* * * * *